(12) United States Patent
Brumbaugh et al.

(10) Patent No.: US 9,173,376 B2
(45) Date of Patent: Nov. 3, 2015

(54) SOW LACTATION FEEDER

(71) Applicant: CTB, Inc., Milford, IN (US)

(72) Inventors: Beau William Brumbaugh, Syracuse, IN (US); Harry R. Van Horn, II, Monterey, IN (US)

(73) Assignee: CTB, Inc., Milford, IN (US)

( * ) Notice: Subject to any disclaimer, the term of this patent is extended or adjusted under 35 U.S.C. 154(b) by 107 days.

(21) Appl. No.: 13/739,485

(22) Filed: Jan. 11, 2013

(65) Prior Publication Data

US 2014/0026818 A1    Jan. 30, 2014

Related U.S. Application Data

(63) Continuation of application No. 13/035,240, filed on Feb. 25, 2011, now Pat. No. 8,596,218.

(51) Int. Cl.
*A01K 5/02* (2006.01)

(52) U.S. Cl.
CPC .................... *A01K 5/0233* (2013.01)

(58) Field of Classification Search
CPC ..... A01K 5/02; A01K 5/0225; A01K 5/0233; A01K 5/0275; A01K 39/014
USPC ............... 119/51.01, 51.11, 53, 53.5, 62, 54, 119/56.1, 61.2
See application file for complete search history.

(56) References Cited

U.S. PATENT DOCUMENTS

| | | | |
|---|---|---|---|
| 920,865 | A | 5/1909 | Hannibal |
| 1,587,775 | A | 6/1926 | Higgins |
| 3,019,765 | A | 2/1962 | Malloy, Sr. |
| 3,116,715 | A | 1/1964 | Krumheuer |

(Continued)

FOREIGN PATENT DOCUMENTS

| | | |
|---|---|---|
| DE | 3807980 A1 | 10/1988 |
| DE | 3807980 A1 | 10/1988 ............... A01K 5/02 |

(Continued)

OTHER PUBLICATIONS

Automated Production Systems: INTaK Ad-Lib Lactation Feeding System; http://www.automatedproduction.com/english/swine/feeding/intak.html (1 of 2) [Jan. 13, 2011 15:32:42]; The Original Berry Feeder, Patent #6,101,975.

(Continued)

*Primary Examiner* — Lisa Tsang
(74) *Attorney, Agent, or Firm* — Harness, Dickey

(57) ABSTRACT

An on-demand animal feed apparatus is provided comprising a receiving chamber, base tube and actuator. The receiving chamber comprises an upper section to connect to a feed supply, a lower section, and an intermediate section disposed between the upper and lower sections. A base tube is connected to the lower section of the receiving chamber and cooperates with the receiving chamber to define the feed reservoir. A lower portion of the base tube defines a discharge opening for dispensing animal feed. An actuator is disposed at least partially within the base tube and is configured to raise and lower in an axial direction in response to movement by an animal, thereby allowing the transfer of animal feed from the feed reservoir through the discharge opening. The lower section of the receiving chamber defines a relief area for the temporary displacement of animal feed when the actuator is raised or lowered.

9 Claims, 6 Drawing Sheets

(56) References Cited

U.S. PATENT DOCUMENTS

| | | | |
|---|---|---|---|
| 3,410,249 A | 11/1968 | Allen et al. | |
| 3,566,844 A | 3/1971 | Occhiodori et al. | |
| 3,688,743 A | 9/1972 | Rack et al. | 119/51.04 |
| 3,782,334 A | 1/1974 | Leon et al. | |
| 3,812,823 A | 5/1974 | Ridder et al. | |
| 3,838,664 A | 10/1974 | Atchley | |
| 4,185,587 A | 1/1980 | Kallin | |
| 4,200,060 A | 4/1980 | Van Daele | |
| 4,348,988 A | 9/1982 | Lawson | |
| 4,799,455 A | 1/1989 | O'Kelley | |
| 4,949,677 A | 8/1990 | Kock | |
| 4,993,365 A | 2/1991 | Weerstra | |
| 4,995,343 A | 2/1991 | Cole et al. | |
| 5,022,347 A | 6/1991 | DenBleyker | 119/54 |
| 5,138,979 A | 8/1992 | Baird et al. | 119/51.04 |
| 5,778,821 A * | 7/1998 | Horwood et al. | 119/53 |
| 5,809,934 A | 9/1998 | Gavet | |
| 5,829,385 A | 11/1998 | Kaspersen | 119/54 |
| 5,924,678 A | 7/1999 | Olde | |
| 6,053,124 A | 4/2000 | Kolbe | 110/51.01 |
| 6,101,975 A | 8/2000 | Berry et al. | |
| 6,116,471 A * | 9/2000 | Miller | 222/199 |
| 6,182,606 B1 | 2/2001 | Wells et al. | |
| 6,311,640 B1 * | 11/2001 | Mercado | 119/51.01 |
| 6,575,118 B1 | 6/2003 | McKee | |
| 6,666,167 B1 | 12/2003 | Carlson | |
| 6,868,801 B2 | 3/2005 | Rovira Badia et al. | 119/51.5 |
| 6,959,664 B1 * | 11/2005 | Keuter et al. | 119/54 |
| 2003/0145796 A1 * | 8/2003 | Rasmussen | 119/53.5 |
| 2007/0289539 A1 | 12/2007 | Berry et al. | |
| 2008/0185401 A1 * | 8/2008 | Luchinger | 222/344 |

FOREIGN PATENT DOCUMENTS

| | | | | |
|---|---|---|---|---|
| FR | 2946836 A1 * | 12/2010 | | A01K 5/02 |
| GB | 2240160 A | 7/1991 | | |
| GB | 2240160 A | 7/1991 | | F16K 21/00 |
| NL | 9401206 A | 3/1996 | | |
| WO | WO-95/19104 A1 | 7/1995 | | |

OTHER PUBLICATIONS

Restriction Requirement mailed Jul. 20, 2012, in corresponding U.S. Appl. No. 13/035,240, filed Feb. 25, 2011.

International Search Report and Written Opinion of the International Searching Authority mailed Jun. 21, 2012, in corresponding PCT/US2012/023734 application.

Automated Production Systems: INTaK Ad-Lib Lactation Feeding System; http://www.automatedproduction.com/English/swine/feeding/intak.html (1 of 2) [Jan. 13, 2011 15:32:42]; The Original Berry Feeder, Patent No. 6,101,975.

* cited by examiner

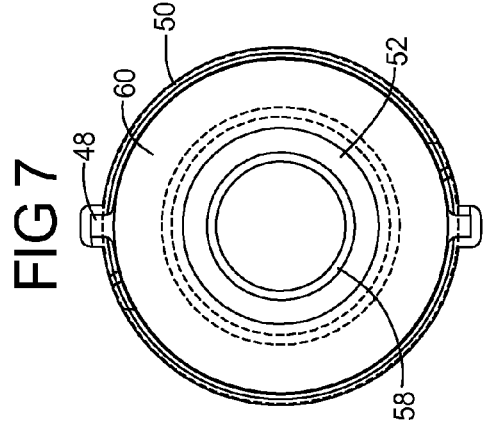
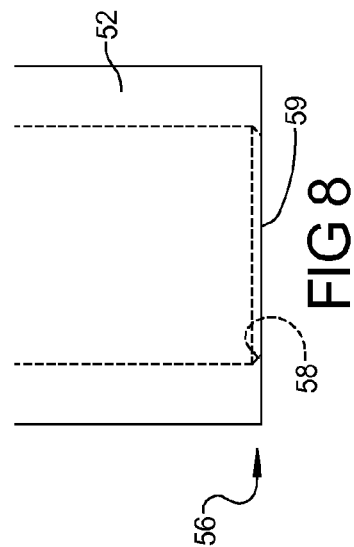
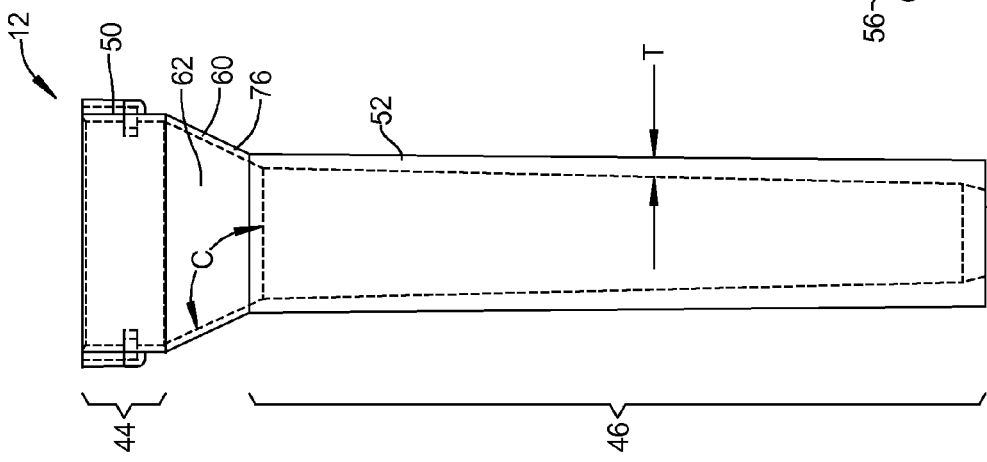
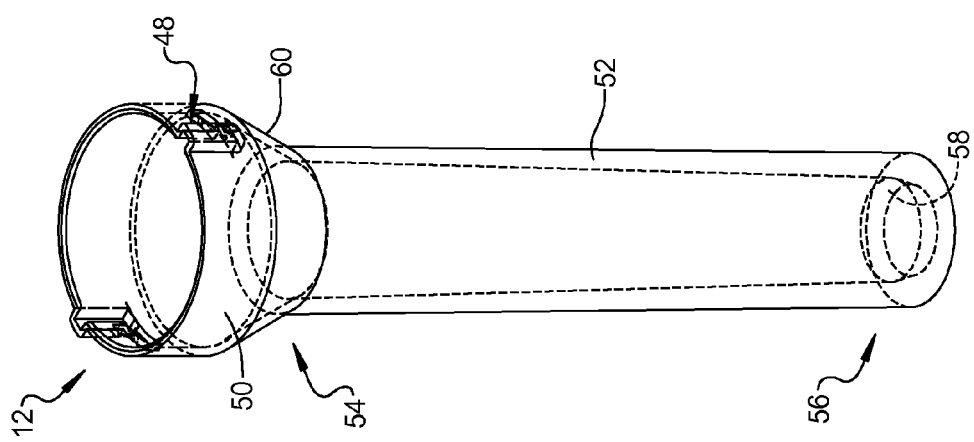

SOW LACTATION FEEDER

CROSS-REFERENCE TO RELATED APPLICATIONS

This application is a continuation of U.S. patent application Ser. No. 13/035,240 filed on Feb. 25, 2012, and issued as U.S. pat. No. 8,596,218 on Dec. 3, 2013. The entire disclosure of the above application is incorporated herein by reference.

FIELD

The present disclosure generally relates to a mechanism and device for the storage and on-demand dispensing of feed to animals, and its related methods of use.

BACKGROUND

This section provides background information related to the present disclosure which is not necessarily prior art.

In the conventional raising of farm animals, various methods have been used in attempts at improved feeding. Certain animals, such as breeding, nursing, and young animals, may have specialized feeding requirements and other needs. Particular needs may be different between animals, whether it is the quantity of food delivered, the number of feedings per day, the appropriate timing of feedings, and the like. For example, it may be desired to allow lactating animals, such as sows, to feed on demand throughout the day, while pregnant sows may only be provided with specific amounts of feed. Nursing and weaning animals, such as piglets, may have yet additional feeding requirements.

Feed that is not eaten may spoil or be rapidly contaminated and wasted by various means. Wasted feed adds further costs and, of course, is desired to be avoided. Additionally, feeding mechanisms with quality components are needed to accommodate aggressive animals. Accordingly, there remains a need for a high quality feeding mechanism that reduces waste, minimizes contamination and odor, cleans easily, and facilitates a variable supply of feed to animals as necessary.

SUMMARY

This section provides a general summary of the disclosure, and is not a comprehensive disclosure of its full scope or all of its features.

In one aspect, the present disclosure provides an on-demand animal feed apparatus comprising a receiving chamber configured to transfer animal feed from a feed supply to a feed reservoir. The receiving chamber comprises an upper section to connect to the feed supply, a lower section, and an intermediate section disposed between the upper and lower sections. A base tube is connected to the lower section of the receiving chamber. The base tube has an upper portion that cooperates with the receiving chamber to define the feed reservoir, and a lower portion defining a discharge opening for dispensing animal feed. An actuator is provided disposed at least partially within the base tube and configured to raise and lower in an axial direction in response to movement by an animal, thereby allowing the transfer of animal feed from the feed reservoir through the discharge opening. The lower section of the receiving chamber defines a relief area for the temporary displacement of animal feed when the actuator is raised or lowered.

In another aspect, the feed apparatus comprises a receiving chamber configured to transfer animal feed from a feed source to a feed reservoir where the receiving chamber defines a relief area for the temporary displacement of feed. A base tube is provided coupled to the receiving chamber to define the feed reservoir. At least a portion of the base tube comprises a tapered cylindrical cross-section for dispensing a predetermined dosage of animal feed. An actuator is disposed at least partially within the base tube and is configured to raise and lower in an axial direction in response to movement by an animal, thereby allowing the on-demand transfer of animal feed from the feed reservoir through a discharge opening of the base tube. The actuator comprises an upper bobber portion for bridging feed from the feed reservoir through the base tube, a center section, and a lower sealing portion configured to selectively seal the discharge opening.

The present disclosure also provides a feed apparatus comprising a receiving chamber configured to transfer animal feed from a feed source to a feed reservoir where the receiving chamber defines a relief area for the temporary displacement of feed. A base tube is provided coupled to the receiving chamber to define the feed reservoir. At least a portion of the base tube comprises a tapered cylindrical cross-section for dispensing a predetermined dosage of animal feed. An actuator is disposed at least partially within the base tube and is configured to raise and lower in an axial direction in response to movement by an animal, thereby allowing the on-demand transfer of animal feed from the feed reservoir through a discharge opening of the base tube. The actuator comprises at least one sealing portion disposed within the feed reservoir and connected to a stem portion extending through an entire length of the base tube and continuing a distance past the discharge opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view including hidden aspects of a base tube member of an animal feed apparatus of the present disclosure;

FIG. 6 is a side plan view including hidden aspects of the base tube member of FIG. 5;

FIG. 7 is a top plan view of the base tube member of FIG. 5;

FIG. 8 is a magnified partial view of the bottom portion of the base tube member of FIG. 5;

Corresponding reference numerals indicate corresponding parts throughout the several views of the drawings.

DETAILED DESCRIPTION

Example embodiments will now be described more fully with reference to the accompanying drawings. Numerous specific details are set forth, including examples of specific components, devices, and methods in order to provide an understanding of embodiments of the present disclosure. It will be apparent to those skilled in the art that specific details need not be employed, that example embodiments may be modified in many different ways, and that the examples should not be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures herein. Spatially relative terms may be intended to encompass different orientations of the device in use or operation in addition to the orientation depicted in the figures.

Figure 1:
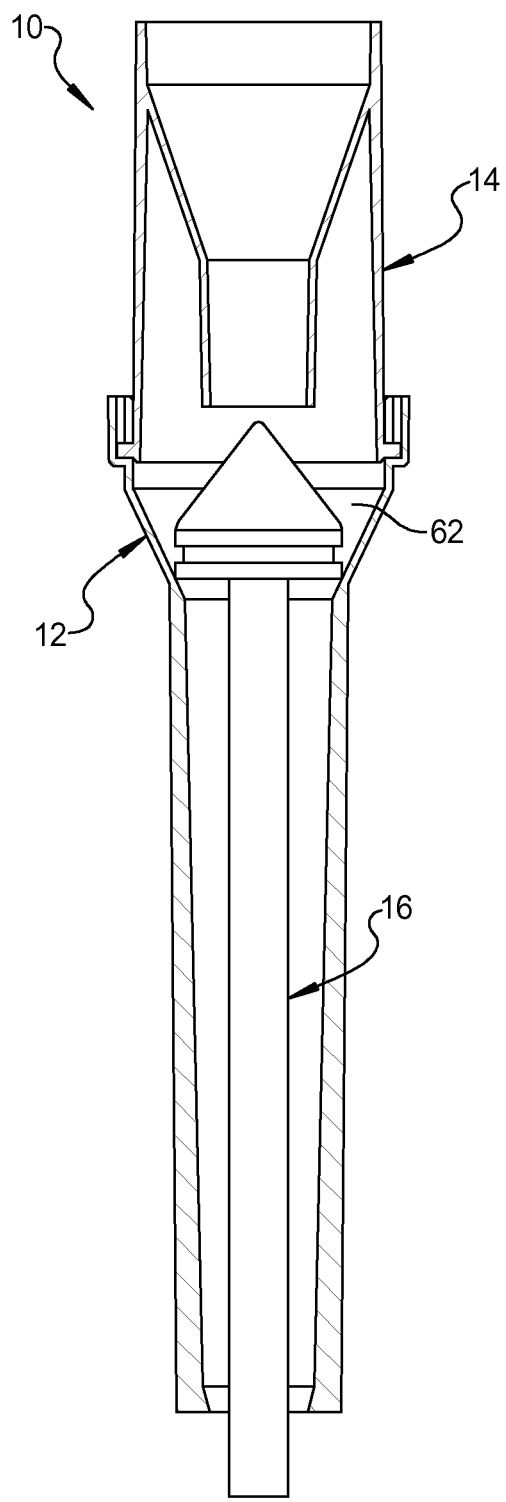
FIG. 1 is a cross-sectional view of an animal feed apparatus of the present disclosure including a side elevation view of an actuation member of one embodiment.
Figure 2:
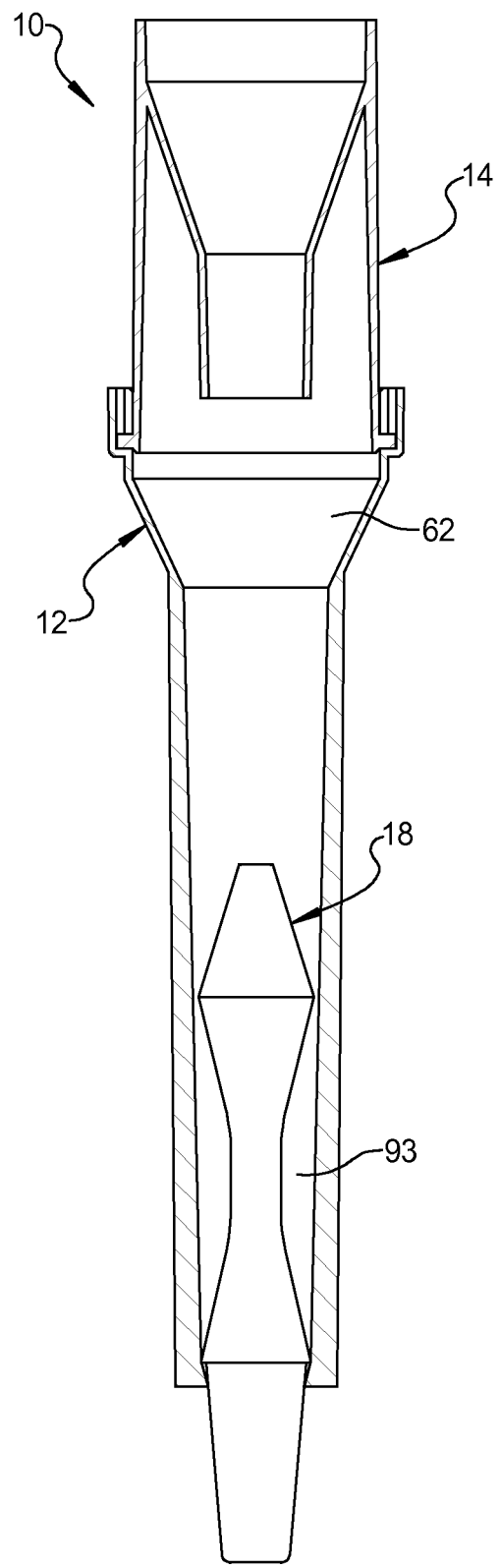
FIG. 2 is a cross-sectional view of an animal feed apparatus of the present disclosure including a side elevation view of an actuation member of a second embodiment.

With reference to FIGS. 1 and 2, the present technology and disclosure relate to an on-demand animal feed apparatus 10 for dry particulate feeds, as well as related methods of operation. The apparatus is animal activated and gravity induced. The term "animal feed apparatus," in accordance with the present disclosure, is not intended to be limited to any particular physical configuration. As shown, the animal feed apparatus 10 may include a plurality of components, such as a base tube member 12, a receiving chamber 14, and an actuating member 16, 18. As will be described in more detail below, preferably the animal feed apparatus 10 is designed to trickle, or dispense feed in one or more controlled amounts, for example, generally between about 0.01 and about 0.1 lbs, or between about 0.02 and about 0.05 lbs each time the apparatus is actuated. It is envisioned that in certain aspects, the feed may be also dispensed in terms of controlled volume. The term "feed" is used herein to refer to food suitable for consumption by an animal; it is intended to generically include solid materials that can be fed to any one of numerous species of animals including, without limitation, pigs, goats, sheep, cows, horses, farm animals, zoo animals, and the like. It is envisioned that various forms of feed may be used with the animal feed apparatus 10 of the present disclosure, including crumble sized feed, pellet feed, mash feed, grit feed, powder feed, and other similar types of feed commonly provided to animals.

The exemplary animal feed apparatus 10 of FIG. 1 is illustrated with a plunger-type actuator component 16, and is particularly useful with pellet type feed or larger type granule feeds having a particle size with an average diameter of about 0.2 inches or greater. The exemplary animal feed apparatus of FIG. 2 is illustrated with a bobber-type actuator component 18, and is particularly useful with mash, grit, powder, or generally smaller type granule feeds having an average diameter of less than about 0.2 inches. It is envisioned that the animal feed apparatus 10 is designed with a generic type base tube member 12 and receiving chamber 14 that can be used with an interchangeable type of actuator 16, 18. For example, if one wants to change feed types (from pellet to mash), all that needs to be done is replace the actuator for that type of feed, the base tube 12 and relief chamber 14 stay the same.

In various aspects, the components of the animal feed apparatus 10 may be made of any of a number of types of durable, rigid plastic materials. Non-limiting examples of suitable plastics include polyvinyl chloride (PVC), polypropylene (PP), polyethylene (PE), high-density polyethylene (HDPE), and the like. If desired, the plastics may optionally be provided with various additives, fillers, colorants, and the like. In certain aspects, it may be desirable to fabricate certain components, such as the base tube, out of a clear or transparent color plastic so that one can see the interior of the feeding apparatus without having to disassemble anything. Various components may include known specially-compounded PVC, which increases resistance to ultraviolet light and resistance to wear. The components may be formed by any number of conventional plastic fabrication techniques including, but not limited to, injection molding, thermal forming, blow molding, rotational molding, and other plastics and forming techniques familiar to those skilled in the art of plastic fabrication and mass production. The animal feed apparatus 10 may also include metal or other non-plastic components as desired or necessary for strength, connection means, or other purpose.

Receiving Chamber

Figure 4:
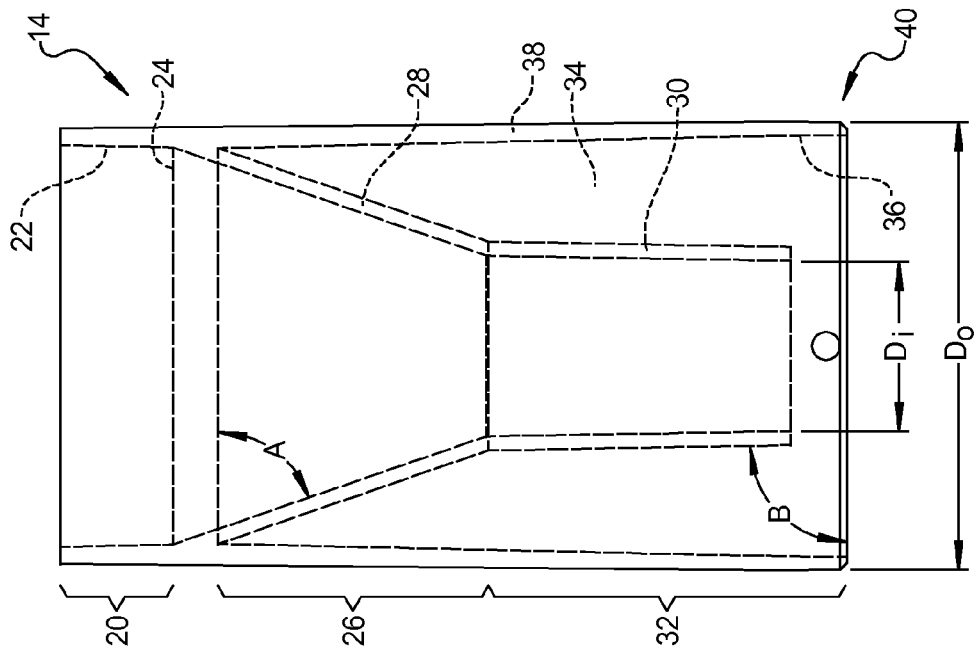
FIG. 4 is a side plan view including hidden aspects of the receiving chamber of FIG. 3.
Figure 3:
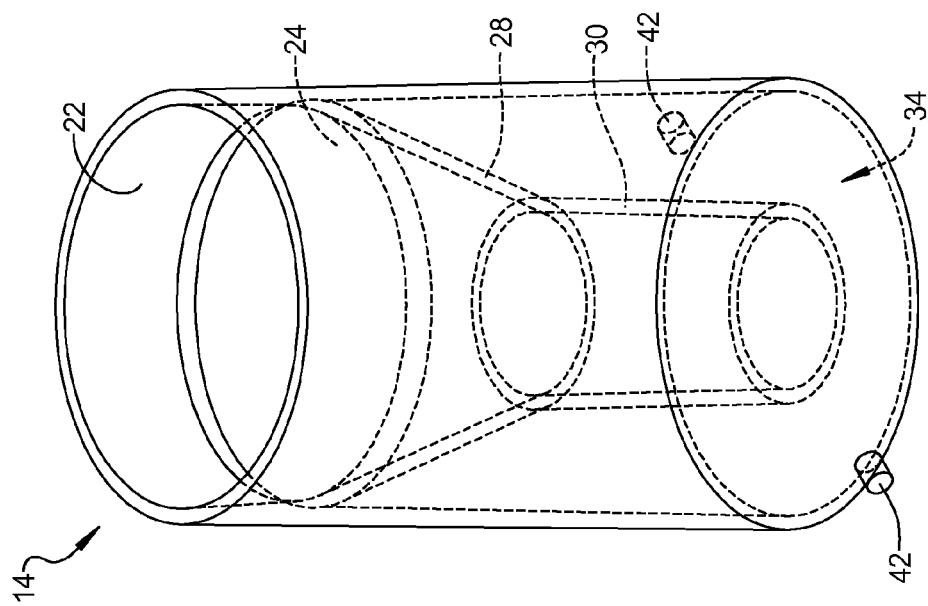
FIG. 3 is a perspective view including hidden aspects of a receiving chamber of an animal feed apparatus of the present disclosure.

FIG. 3 is a perspective view, including hidden aspects, of an exemplary receiving chamber, or relief cap 14, of an animal feed apparatus 10 of the present disclosure. FIG. 4 is a side plan view, including hidden elements, of the receiving chamber 14 of FIG. 3. As best shown in FIG. 4, the receiving chamber 14 may be described, in a non-limiting manner, as having three main portions, or sections. The receiving chamber 14 may be made of a single, monolithic component or may include two or more parts joined together. The upper section 20 of the receiving chamber 14 may be used to connect the animal feed apparatus 10 to a feed supply, such as an auger or feed tube (not shown). The upper section 20 is illustrated as having a generally cylindrical shape and its inner wall 22 may be provided with a slight taper or angle to allow for a slip-fit type of connection to the feed supply tube, which is typically connected to an auger-type fill system known in the art. Optional mechanical fastening means may also be provided to secure the feed supply tube to the upper section 20. The upper section 20 may be provided with an optional extending wall 24, or seat, upon which the end of an auger or feed supply tube may rest. It should be understood that the specific design of the upper section 20 is not limiting, and it may be configured to have numerous shapes to allow for an appropriate connection to a desired food supply or food source.

An intermediate section 26 is shown provided with a substantially inverted frusto-conical shaped interior wall 28 that may serve as a transition area to moderate the flow of feed from the feed supply tube area to a narrower inner delivery tube 30 portion of a lower section 32 of the receiving chamber 14. The transition area of the intermediate section 26 also serves to store a certain amount of feed prior to entry into a feed reservoir, and its ultimate dispensing to the animal. Although other potential configurations may be used, in certain cases the angle of the transition area at reference point A may between about 70° and about 80°; preferably the angle is about 77°. The length of this intermediate wall section may vary depending upon the ultimate feed particle size, or alternatively, may be proportional to the inner diameter of the base tube.

In certain embodiments, the inner delivery tube portion 30 of the lower section 32 may be provided with a uniform inner diameter (D). In other embodiments, however, inner delivery tube portion 30 may be provided with a slight taper, wherein the inner diameter slightly decreases from an upper portion to a lower portion of the lower section 32. Although other potential configurations may be used, in certain cases the angle at reference point B may between about 85° and about 95°; preferably the angle is about 89°.

The lower section 32 of the receiving chamber 14 further defines an opening for a relief area 34 between the inner delivery tube 30 and the inner surface 36 of the receiving chamber cylindrical outer wall 38. As shown, the delivery tube 30 may be concentric or substantially concentric with the receiving chamber's cylindrical outer wall 38. The relief area 34 is shown disposed between the inner delivery tube 30 and the cylindrical outer wall 38. The relief area 34 may extend from the bottom edge 40 of the receiving chamber 14 and continue up to the horizontal or angled extending wall area 24 separating the upper section 20 from the intermediate section 26. As will be described in more detail below, the relief area 34 may provide an open space for a certain amount of the feed to temporarily retreat, or displace, when an actuator is lifted, and may relieve the actuator 16, 18 of at least some of the weight of the feed stored above it, making it easier for the animal to raise. In various aspects, the outer wall 38 of the receiving chamber 14 may be provided, for example, with a uniform thickness of about 0.125 inches, depending on the selected material and intended use, and may typically be provided with a uniform outer diameter ($D_o$). The receiving chamber 14 may also be provided with one or more protrusions 42 that can serve as a suitable anchoring mechanism for the removable connection of the receiving chamber 14 to the base tube component 12.

Base Tube

FIG. 5 is a perspective view, including hidden elements, of an exemplary base tube component 12 of an animal feed apparatus 10 of the present disclosure; FIG. 6 is a side plan view, including hidden elements, of the base tube 12 of FIG. 5. As shown, the base tube component 12 includes an upper connecting portion, or first portion 44, operable for coupling to the receiving chamber 14, and a lower tubular portion, or second portion 46, for transferring and ultimately dispensing the feed to an animal. Removable coupling of the base tube 12 and the receiving chamber 14 may be accomplished using various types of attachment or locking systems as known in the art. In the embodiment illustrated, the protrusions 42 of the receiving chamber 14 are aligned with slots 48 formed within the substantially cylindrical wall 50 of the upper connecting portion 44. Once lowered within the wall 50, the receiving chamber 14 may be rotated counterclockwise to a locking position. The removable coupling of the base tube 12 and the receiving chamber 14 allows for easy disassembly of the apparatus for cleaning, and further allows for the easy insertion or removal of the actuator 16, 18. For example, once the receiving chamber 14 is removed, the actuator 16, 18 can simply be inserted into (or removed from) the base tube 12 without disturbing any other components of the apparatus.

The inverted frusto-conical wall 60 of the upper connecting portion cooperates with the receiving chamber 14 to define a feed reservoir 62 as best seen in FIGS. 1 and 6. Although other potential configurations may be used, in certain cases the angle of the conical wall 60 at reference point C may between about 110° and about 120°; preferably the angle is about 115°.

In the example embodiments illustrated in the drawings, the internal tubular wall 52 may be provided with a slight taper. For example, the base tube 12 would be provided with a tapered cylindrical cross-section, wherein the inner diameter slightly decreases from an upper end 54 to a lower end 56 of the base tube 12. The outer, exposed portion of the base tube 12 may be provided with a uniform outer diameter. Although other potential configurations may be used, in certain cases the angle of the taper may between about 0.1° and about 2°; preferably the angle is about 1.33°. In certain aspects, the length of this lower tubular portion 46 may vary, depending upon the predetermined dosage that is to be dispensed to the animal. It is envisioned that the interior shape may be decreasing cubical or pyramidal as opposed to decreasing conical as shown. The thickness (T) of the tubular wall 52 may range between about 0.125 inches at the upper end 54 region of the base tube and about 0.5 inches at the lower end 56 of the base tube 12. In various aspects, the tubular portion 46 of the base tube 12 may be provided with a length such that the volume of the interior of the base tube 12 acts as a meter to provide a measured or readily ascertainable amount of feed during each disbursement. In certain aspects, the base tube 12 may be adjustable in length. By way of example, the base tube 12 may be made of two or more tubular portions, of various sizes, threaded or otherwise mechanically joined together.

FIG. 7 is a top plan view of the base tube 12 of FIG. 5; FIG. 8 is a magnified partial view of the bottom portion of the base tube 12. As best shown in FIG. 8, the bottom of the base tube 12 may be optionally be provided with an inwardly extending sealing lip, or retaining edge 58, at the discharge opening end. Such an extending edge 58 can serve as a seat or stop mechanism to support a bobber-type actuator, as will be discussed in more detail below. It may also serve to seal the discharge opening when the bobber-type actuator is in a rest position, preventing further release of feed.

Actuators

The actuator member 16, 18 is configured to raise and lower in response to actuation by an animal, for example, via the snout of a pig, thereby allowing the transfer of feed to trickle or flow from the feed reservoir 62 through the base tube 12 and exiting through the discharge opening 59. It is envisioned that such actuation may be from the trained movement of an animal. In various aspects, the movement of actuator 16, 18 is generally in an axial or linear manner. In other words, rotation generally does not result in actuation that dispenses feed. In this way, moisture or contamination is less likely to enter the feed reservoir area that may otherwise lead to spoiling, or allow food to stick together and potentially blocking the passages.

Figure 9:
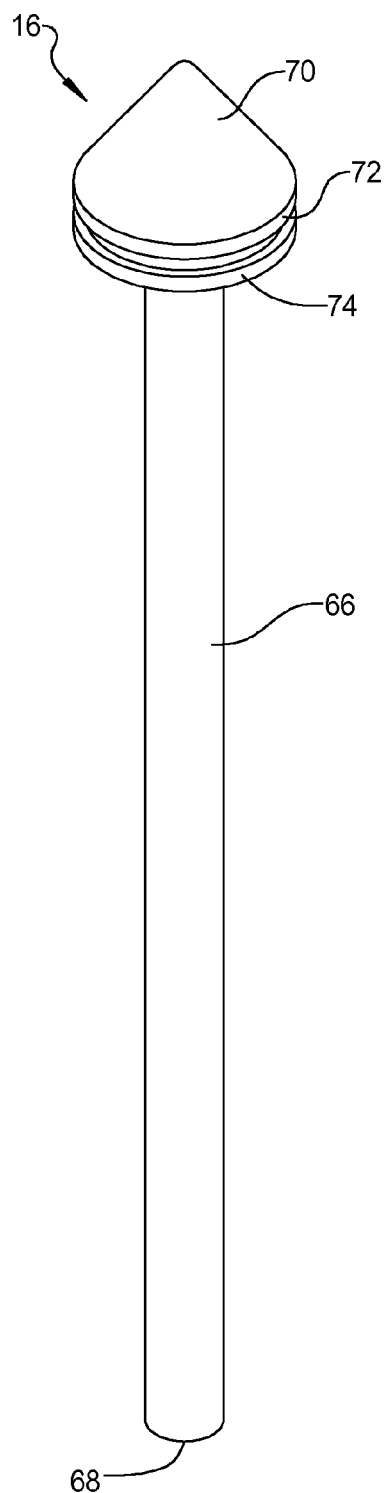
FIG. 9 is a perspective view of one embodiment of an actuator member for use with an animal feed apparatus of the present disclosure.
Figure 10:
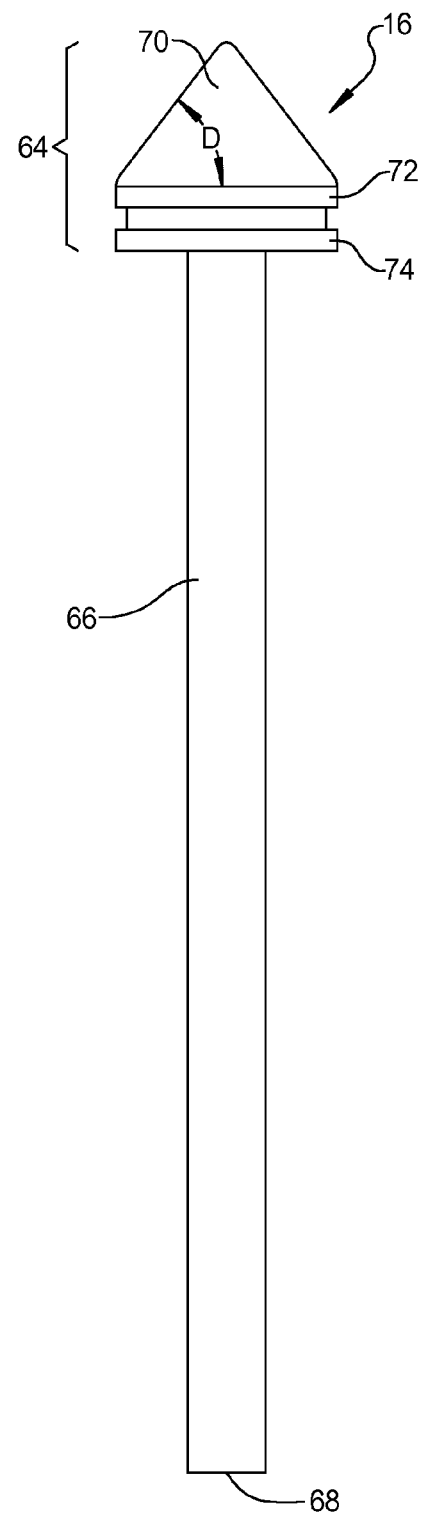
FIG. 10 is a side plan view of the actuator member of FIG. 9.

FIG. 9 is a perspective view of a plunger-type actuator 16 according to one embodiment of the present disclosure; FIG. 10 is a side plan view of FIG. 9. As noted above, a plunger-type actuator 16 may be most useful with pellets and larger type granular feeds.

The plunger 16 of FIGS. 9 and 10 is provided with a sealing portion 64 and a stem portion 66. In various embodiments, the stem portion 66 may be a hollow tube, connected to the sealing portion 64 at one end opposing an actuating portion 68 at the other end. The plunger 16 may be a unitary component or may comprise a plurality of components joined together. The sealing portion 64 may comprise a conical surface 70. Although other potential configurations may be used, in certain cases the angle of the conical surface 70 as indicated by reference point D may be between about 50° and about 60°; preferably the angle is about 54°. The sealing portion 64 may also be provided with one or more sealing members, or ribs 72, 74. In use, the plunger 16 is located in the base tube 12, wherein the lowermost sealing rib 74 rests and sealingly engages the opening of the tube portion as indicated by reference number 76. The stem extends through the entire length of base tube 52 and extends a distance past the discharge opening 59. The sealing portion 64 is located within the feed reservoir 62 and is operable to move in an axial direction between the bottom of the delivery tube 30 of the receiving chamber 14 and the top of the tube opening 76 of the base tube 12. In various embodiments, the relief chamber is designed such that the sealing portion 64 does not come into contact with the inner delivery tube 30 at all, even when in a fully raised position due to axial movement of the actuator by the animal. In the raised position, a predetermined dosage of feed from the feed reservoir 62 is allowed to trickle around the sealing portion 64 and is transferred down the base tube out the discharge opening 59 to the animal. During axial movement of the plunger 16, a certain amount of feed is also permitted to temporarily move within the relief gap area 34 as described above.

Figure 11:
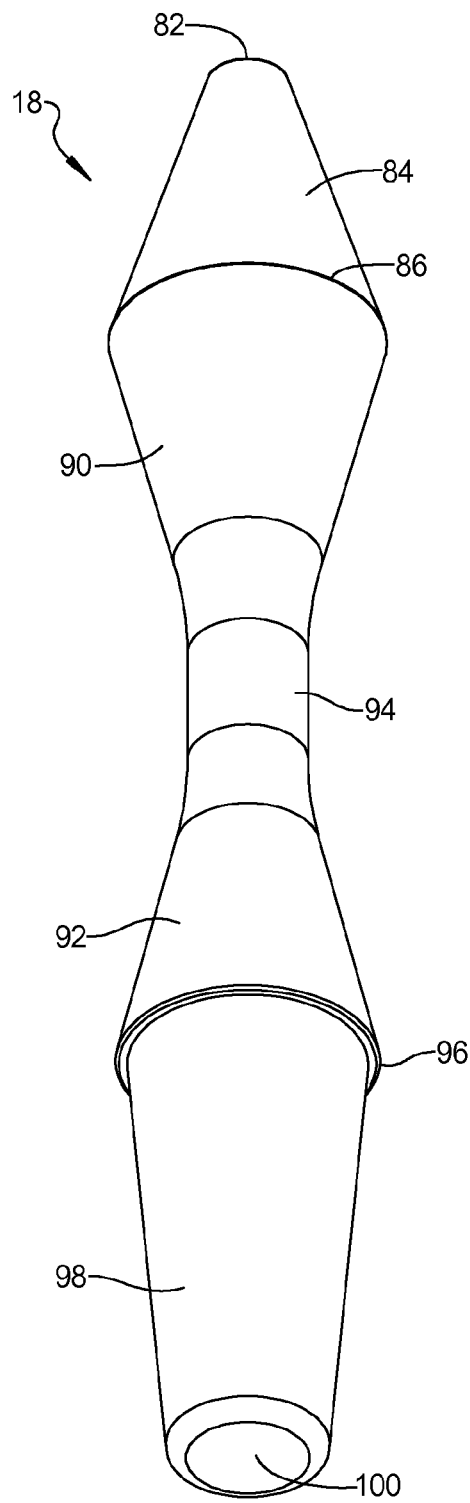
FIG. 11 is a perspective view of a second embodiment of an actuator member for use with an animal feed apparatus of the present disclosure.
Figure 12:
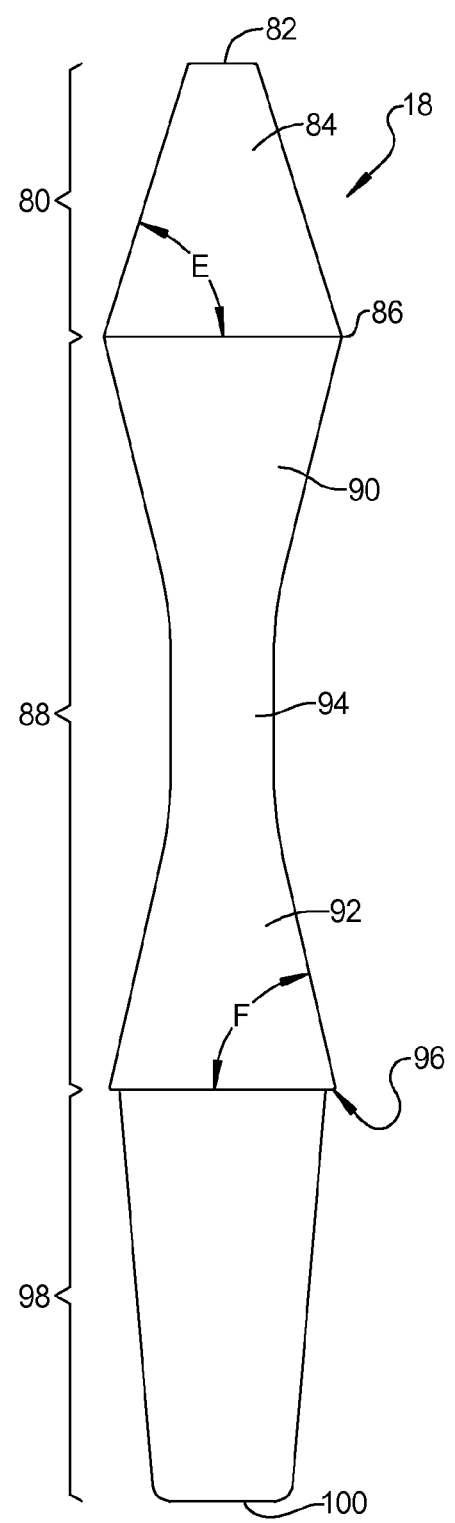
FIG. 12 is a side plan view of the actuator member of FIG. 11.

FIG. 11 is a perspective view of a bobber-type actuator 18 according to one embodiment of the present disclosure; FIG. 12 is a side plan view of FIG. 11. As noted above, a bobber-type actuator 18 may be most useful with mash, grit, powder, or generally smaller type granular feeds. As best shown in FIG. 12, the actuator 18 may be described as having three main portions, or sections. The upper section, or bobber portion 80, of the actuator 18 is configured to move both axially and radially to bridge feed from the feed reservoir 62 and through the base tube. As shown, the bobber portion 80 may be provided with a substantially flat top portion 82 and a frusto-conical wall 84. Although other potential configurations may be used, in certain cases the angle of the frusto-conical wall 84 as indicated by reference point E may between about 70° and about 75°; preferably the angle may be about 73°. In order to allow the desired flow of feed through the base tube, the widest part of the bobber portion 80 has an outer diameter 86 smaller than an inner diameter of the adjacent surrounding base tube. For example, in certain embodiments, the outer diameter 86 of the bobber portion 80 may be from about 70% to about 85% of the size of the base tube inner diameter in the adjacent area. This provides a suitable gap for feed to travel. As a non-limiting example, a gap from about 0.1 inches to about 0.3 inches may be provided between the bobber and the base tube, depending on feed particle size and the desired flow of feed.

As shown, the center section 88 of the actuator 18 may be provided with a substantially hourglass-type shape, and may define an intermediate holding area 93 (as best shown in FIG. 1) between the actuator 18 and the base tube 12 to hold a predetermined amount of feed. The upper bobber portion 80 of the actuator defines a first outer diameter 86 and the lower sealing portion defines a second outer diameter 96. The area between the first and second outer diameters defines the intermediate holding area 93 for feed. The size, shape, and length of the center section 88 may be selected based on the predetermined dosage of feed desired. For example, the shape of the center section 88 defines a specific volume of the intermediate holding area 93 that will temporarily hold feed prior to being discharged. A holding area 93 with a larger volume will temporarily store more feed for discharge than a holding area 93 with a smaller volume. As shown in FIGS. 11 and 12, the actuator may be provided with a center section 88 including an upper portion 90 having an inverted frusto-conical surface, and a lower sealing portion 92 having a frusto-conical surface. The upper portion 90 and lower portion 92 may be separated by a tubular middle portion 94. The length of the middle portion 94 may influence the volume of feed in the holding area 93. Thus, in certain aspects, it may be desirable to have an actuator where the length of the middle portion 94 is adjustable. As a non-limiting example, the actuator 18 may comprise two components threaded together, where the length of the middle portion 94 can be increased or decreased. The widest part of the lower sealing portion 92 may include an annular sealing lip 96 that sealingly engages the base tube 12 and may rest on edge 58. In various aspects, the lower sealing portion 92 is configured to maintain the bobber portion 80 in a substantially centered position within the base tube. The lowest section 98 of the actuator 18 comprises a generally cylindrical wall with a flat end portion 100. This lowest section 98 extends a distance from the discharge opening 59 of the base tube 12 sufficient to provide an exposed length for an animal to actuate.

The present disclosure also provides a method for providing on-demand feed to an animal. The method comprises coupling a receiving chamber and a tapered base tube that cooperate to define a feed reservoir. The method includes providing an actuator member disposed at least partially within the base tube and configured to raise and lower in an axial direction. Animal feed is transferred from a feed source to a feed reservoir, and the animal is allowed to control the movement of the actuator member for on-demand discharge of a predetermined dosage of feed from the feed reservoir. In various aspects, the method includes providing a relief area in fluid communication with the feed reservoir allowing for the temporary displacement of a resultant portion of feed in the feed reservoir that is moved as a result of axial actuator movement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An on-demand animal feed apparatus comprising:
a receiving chamber configured to transfer animal feed from a feed supply to a feed reservoir, the receiving chamber comprising an upper section to connect to the feed supply, a lower section, and an intermediate section disposed between the upper and lower sections;
a base tube connected to the lower section of the receiving chamber, the base tube having an upper portion that cooperates with the receiving chamber to define the feed reservoir, and a lower portion defining a discharge opening for dispensing animal feed; and
an elongated actuator disposed at least partially within the base tube along a length of the base tube and having a distal end extending out of a distal end of the base tube to an exterior of the apparatus, the actuator being configured to raise and lower in an axial direction in response to direct contact of the distal end of the elongated actuator and movement of the actuator by an animal, thereby allowing an on-demand transfer of the animal feed from the feed reservoir through the discharge opening,
wherein, even when feed is provided in the receiving chamber to a level above the lower section, the lower section of the receiving chamber includes a relief area defining a void above the actuator where no feed is present between movements of the actuator by the animal, and wherein the relief area enables a temporary upward displacement of the animal feed into the void of the relief area when the actuator is raised,
wherein the receiving chamber restricts passage of the elongated actuator through the receiving chamber and the base tube restricts passage of the elongated actuator through the base tube, wherein the receiving chamber includes a coupling member and the base tube includes a cooperating coupling member, and wherein the coupling member and cooperating member releasably couple the receiving chamber to the base tube to permit insertion and removal of the elongated actuator from the base tube when the base tube is uncoupled from the receiving chamber, and wherein the receiving chamber comprises a cylindrical outer wall and the lower section of the receiving chamber comprises an inner delivery tube inside of and substantially concentric with the cylindrical outer wall.

2. The animal feed apparatus of claim 1, wherein the relief area including the void is disposed between the inner delivery tube and the cylindrical outer wall of the receiving chamber.

3. The animal feed apparatus of claim 1, wherein the actuator does not contact the inner delivery tube when the actuator is in a raised position due to axial movement of the actuator by the animal.

4. The animal feed apparatus of claim 1, wherein the intermediate section of the receiving chamber comprises a substantially inverted conical shaped interior wall.

5. The animal feed apparatus of claim 1, wherein axial movement of the actuator by the animal results in the transfer of a predetermined dosage of the animal feed from the feed reservoir through the discharge opening.

6. The animal feed apparatus of claim 5, wherein the predetermined dosage comprises between about 0.02 lbs and about 0.05 lbs.

7. The animal feed apparatus of claim 1, wherein the actuator comprises at least one sealing portion disposed within the feed reservoir and connected to a stem portion extending through an entire length of the base tube and continuing a distance past the discharge opening.

8. The animal feed apparatus of claim 7, wherein the at least one sealing portion of the actuator comprises a conical surface with at least one sealing rib configured to sealingly engage an opening of the base tube.

9. The animal feed apparatus of claim 1, wherein the actuator comprises an upper bobber portion for bridging feed from the feed reservoir through the base tube, and a lower sealing portion configured to selectively seal the discharge opening.

* * * * *